United States Patent Office 3,446,850
Patented May 27, 1969

3,446,850
METHOD FOR PREPARING DIHYDROISOPHORONE
Demetrio P. Cotrupe, Rifle, Colo., and William E. Wellman, Edison, and Paul E. Burton, Westfield, N.J., assignors to Esso Research and Engineering Company, a corporation of Delaware
No Drawing. Filed Dec. 14, 1966, Ser. No. 601,537
Int. Cl. C07c 35/18
U.S. Cl. 260—586                              11 Claims

ABSTRACT OF THE DISCLOSURE

Catalytic hydrogenation of feed comprising 5–15 mole percent isophorone, 5–15 mole percent 3,3,5-trimethylcyclohexanol, and 70–90 mole percent dihydroisophorone yields high selectivity to dihydroisophorone with low amounts of impurities. Temperature must be above 210° C. with molar ratio of hydrogen to isophorone preferably below 1.0.

This invention relates to an improved process for preparing dihydroisophorone. More particularly, this invention relates to the catalytic hydrogenation of a dihydroisophorone-rich feed mixture which comprises dihydroisophorone, isophorone and 3,3,5-trimethylcyclohexanol. Still more particularly, this invention relates to a process for preparing dihydroisophorone by the catalytic hydrogenation of a feed mixture comprising about 5–15 mole percent isophorone, 5–15 mole percent 3,3,5-trimethylcyclohexanol, and about 70–90 mole percent dihydroisophorone at temperatures above 210° C. and at a hydrogen to isophorone mole ratio preferably of less than 1.0.

The increasing use of synthetic resin systems, particularly the vinyl resin systems, in the preparation of lacquers, varnishes, dopes and other coating and finishing materials, has led to the widespread search for new and improved solvents for use in compounding vinyl resin compositions. Such solvents are generally required to be high boiling, able to dissolve a high content of vinyl resins without gellation, permit substantial dilution with low cost hydrocarbon diluents, not deteriorate upon storage, etc. Certain cyclic ketones, such as isophorone and dihydroisophorone exhibit these properties to a marked extent. Isophorone is currently in widespread use but suffers such drawbacks as a tendency to discolor upon standing and also has been classified as a reactive solvent by some authorities. However, it appears that dihydroisophorone does not exhibit these drawbacks and may satisfactorily be used in place of isophorone. The widespread use of dihydroisophorone has, however, been seriously hindered by the lack of a practical and/or economic process to prepare this product in large quantities and with the high degree of purity required by resin formulators.

The catalytic hydrogenation of unsaturated ketones to saturated ketones and saturated aldehydes is an old and well known process. Thus, in U.S. Patent No. 2,264,625 it is disclosed that dihydroisophorone may be readily prepared by the hydrogenation of isophorone. However, extreme caution must be observed in such reactions since over-hydrogenation will yield the isomeric alcohols cis- and trans-3,3,5-trimethylcyclohexanol and under-hydrogenation will result in large quantities of unreacted isophorone. Neither of these two situations is desirable since (1) over-hydrogenation to the alcohols results in the formation of trans-3,3,5-trimethylcyclohexanol which is extremely difficult to separate from the dihydroisophorone, i.e. the boiling point of trans-3,3,5-trimethylcyclohexanol is 194° C. and the boiling point of dihydroisophorone is 189° C.; (2) under-hydrogenation resulting in large quantities of unreacted isophorone permits the formation of β-isophorone (isophorone exists as two isomers, α-isophorone and β-isophorone), the β-isomer being extremely difficult to separate from dihydroisophorone, i.e. the boiling point of β-isophorone is 184–186° C. The presence of the alcohol impurity deleteriously affects the solvating ability of the dihydroisophorone, while the presence of β-isophorone leads to discoloration of the solvent which is otherwise water white. Thus, the preparation of high purity dihydroisophorone, i.e. 95+% and preferably 99+% is severely complicated by the presence of either or both of these components in any dihydroisophorone product mixture.

One suggestion for preparing dihydroisophorone appears in U.S. Patent 2,560,361. This patent suggests that dihydroisophorone be prepared by hydrogenating a mixture of isophorone and alcohol in equivalent molar amounts. However, such a scheme is not wholly practical for the preparation of dihydroisophorone from isophorone, since two separate synthetic steps are necessary. The first is the formation of the alcohol from isophorone, and the second is the trans-hydrogenation reaction between the alcohol and additional isophorone. Further, the reaction as described, is slow and takes 12 hours to get to only 74% conversion of starting material. Moreover, the reaction product still contains substantial amounts of isophorone and alcohol. Thus, the high purity dihydroisophorone required in modern markets cannot be achieved because of the impurity level of the reaction product.

However, it has now been discovered that by maintaining several critical conditions during the reaction, i.e. the ratio of reactants, operation at temperatures above about 210° C., high purity dihydroisophorone can be prepared economically. Thus, in accordance with the present invention, exceedingly high purity dihydroisophorone can be prepared in a continuous process by the catalytic hydrogenation of a feed mixture which comprises about 5–15 mole percent isophorone, preferably about 10 to 15 mole percent, about 5–15 mole percent of 3,3,5-trimethylcyclohexanol, preferably 10 to 12 mole percent, and about 70–90 mole percent dihydroisophorone, preferably 75 to 80 mole percent, at temperatures in excess of about 210° C., preferably 210° C.–250° C., more preferably 220 to 235° C. and still more preferably 225–230° C., at a hydrogen/isophorone molar ratio preferably of less than 1.0, more preferably 0.5/1 to 0.9/1, and distilling to recover the product dihydroisophorone. Under these conditions the conversion of isophorone and selectivity to dihydroisophorone is such as to permit the recovery of an exceedingly pure dihydroisophorone.

While not wishing to be bound by any particular theory, it is believed that the excellent purity dihydroisophorone resulting from the present invention, may be based on maintaining the amount of β-isophorone in the reactor effluent at an acceptably low level by maintaining the total isophorone feed at below about 15 mole percent, i.e. the α/β equilibrium ratio is about 49/1 at reaction temperatures, while effecting relatively high conversions and a high selectivity to dihydroisophorone. However, the feed must contain the three reactants, i.e. isophorone, dihydroisophorone, and 3,3,5-trimethylcyclohexanol, since hydrogenation of a feed mixture containing about 15 mole percent isophorone and about 85 mole percent dihydroisophorone only, yields very poor selectivity to the dihydroisophorone due to the build-up of the alcohols, cis- and trans-3,3,5-trimethylcyclohexanol. The hydrogenation of a similarly concentrated feed where the alcohol was utilized in place of dihydroisophorone would be unsuitable because the difficult to separate trans-alcohol would be present in large amounts, i.e. the equilibrium ratio of cis- to trans-alcohol is about 5/1 at reaction temperatures. Thus, it has been found that by adding a critical amount of the over-hydrogenation product, i.e. the alcohol, to the reaction mixture, it is possible to obtain high selectivities to the dihydroisophorone product, i.e. on the order of about 70+%, preferably about 85+%, more preferably 95+%, and conversions of 40+%, preferably 50+%, more preferably 60+% at reaction temperatures. The criticality in the amount of alcohol added exists because an insufficient amount will not allow the high dihydroisophorone selectivities, while too much will cause a difficult separation of the product dihydroisophorone and trans-alcohol. The resulting high product selectivity is believed to be due to the presence of sufficient alcohol to prevent the formation of additional alcohol during the hydrogenation reaction, i.e. the alcohol reaction equilibrium is shifted to the left, and, therefore, the hydrogen is utilized only in the hydrogenation of the isophorone to dihydroisophorone and not in the over-hydrogenation reaction to make alcohol product.

The interplay of the critical proportions of the feed components is complemented by conducting the reaction at temperatures in excess of 210° C. At such temperatures the favorable equilibrium concentrations for isophorone isomers and alcohol isomers exist. Further, the selectivity to dihydroisophrone, which should be preferably at least 80%, falls off at decreasing temperatures. Above about 250° C., the selectivity to dihydroisophorone suffers due to thermal decomposition resulting in excessive formation of light ends.

While it is not a critical feature of this invention, it has been found that decreasing hydrogen/isophorone molar ratios lead to an increasing selectivity to dihydroisophorone under the critical reaction conditions of this process. However, the effect of the hydrogen/isophorone ratio becomes more influential as the critical relationships stray towards their limits. Consequently, the hydrogen/isophorone molar ratio should be below about 1.2/1.0, preferably below about 1.0/1.0, and more preferably about 0.5/1.0 to 0.9/1.0.

In addition to the critical process conditions described herein, the present novel process is normally conducted at superatmospheric pressures in the presence of a suitable hydrogenation catalyst. Generally, pressure requirements are not critical but higher pressures result in slightly lower selectivities. The desirable pressures may range from about 5 p.s.i.g. to about 200 p.s.i.g., preferably 20 to 100 p.s.i.g.

The catalyst may be any suitable hydrogenation catalyst. For example, the heavy metals of Groups I, II and VIII of the Periodic System, as well as their oxides and sulfides are quite suitable. Illustrative of such catalysts are: iron, cobalt, nickel, copper, zinc, Raney nickel, copper and chromium oxides, nickel or kieselguhr, platinum, palladium, rhodium, iridium, etc. These catalysts may be used as such or supported on various carriers such as pumice, alumina, bauxite, carbon, silica, synthetic silicates, bleaching earths, etc. The preferred catalysts contain nickel, i.e. Raney nickel, supported nickel, e.g. nickel on kieselghur, or unsupported nickel. The catalyst, when used in the supported form, comprises about 20–60 wt. percent active catalyst, preferably 35–45 wt. percent based on the support.

The hydrogen may be used as such or in a hydrogen containing gas stream wherein the other components are inert to the reaction system, e.g. hydrogen-nitrogen, hydrogen-argon, and the like.

In continuous reactions the flow rate, i.e. space velocity, is not critical and may range from about 1 v./v./hr. to 20 v./v./hr., preferably 4 to 12 v./v./hr.

Isophorone is a commercially available compound and is conveniently prepared by the condensation of acetone in the presence of suitable catalysts, e.g. lime, sodium ethylate, sodium hydroxide. The dihydroisophorone and trimethylcyclohexanol can be prepared by hydrogenating isophorone. However, the availability of these materials is merely a condition of start-up in any continuous hydrogenation reaction.

In order to avoid the build-up of large quantities of the β-isophorone and trans-alcohol contaminants in the product, a portion of the reactor effluent is normally recycled back to the reactor. Generally, between about 50 and 90 vol. percent of the reactor effluent, preferably 60–80 vol. percent, is recycled. The recycle stream may be charged directly to the reactor or may be admixed with fresh isophorone feed, or other recycle stream prior to being introduced to the hydrogenation reactor.

The reactor effluent recovered as product, i.e. not recycled, can be processed in any conventional manner in order to recover the dihydroisophorone product. For example, the reactor effluent may be passed through a topping tower to remove any light ends prior to being fed to a fractionator where a portion of dihydroisophorone product is recovered. The fractionator bottoms, comprising dihydroisophorone, isophorone and alcohol may then be recycled to the hydrogenation reactor for further processing. Another recovery scheme comprises feeding the total reactor effluent to a dihydroisophorone fractionator, removing a portion of dihydroisophorone product and light ends overhead, recycling the bottoms to the hydrogenation reactor and separating the dihydroisophorone from the light ends in a second fractionator.

The importance of maintaining a low isophorone feed becomes apparent where the high purity product is obtained from the distillation tower. Since isophorone can not be completely converted, some β-isomer will always be present. Further, since impurities and isophorone are removed during distillation, the β-isomer content will increase on a percent basis even though the number of moles remains the same. Consequently, in order to prepare a high purity product, the isophorone feed concentration must be maintained between the critical limits presented herein.

However, because of the critical relationships existing during the hydrogenation reaction, the recovery of a substantially pure dihydroisophorone product is not critical and will be clear to one skilled in the art.

In carrying out the present novel process on a continuous basis, a suitable hydrogenation reactor is charged with the proper feed mixture, e.g. 14.7% isophorone, 11.3% alcohol, 73.2% dihydroisophorone, at an average temperature of 230° C., and a hydrogen/isophorone molar ratio of 0.6/1. The mixture is passed over a catalyst bed comprised of 40 wt. percent nickel on alumina, bed size of 31" x 2", at a space velocity of 4 v./v./hr. and 90 p.s.i.g. The reactor effluent contains 80.5% dihydroisophorone, which shows a 95.7% selectively based on converted isophorone. A small amount of light ends and heavy ends, about 4.1% based on converted isophorone is also formed during the reaction, along with a 1.7% selectivity, based on converted isophorone to the alcohol. The unreacted isophorone is insufficient to cause serious problems in the distillation of dihydroisophorone.

The various aspects and modifications of the present process will be made more apparent by reference to the following description and accompanying examples. However, no limitations except those in the appended claims are to be implied by these illustrations.

Example 1 (Runs 1-9)

A fixed-bed tubular reactor with inside dimensions of 1¹³⁄₁₆ inch x 41¼ inch was packed to a height of 31 inches with ³⁄₁₆ inch by ⅛ inch pellets of a preactivated and stabilized supported nickel hydrogenation catalyst containing 40% nickel on calcium aluminum silicate. This reactor was operated on a continuous basis at a liquid feed rate of 4.1 v./v./hr. by charging to it various feed compositions of dihydroisophorone, isophorone and 3,3,5-trimethylcyclohexanol. The amount of hydrogen introduced into the hydrogenation reactor and the average hydrogenation bed temperatures were varied for each particular feed composition. The dihydroisophorone thus produced was recovered by fractionation of the total reactor effluent. The light ends were first removed by topping, then the dihydroisophorone was removed by fractionation at atmospheric pressure. Operating conditions and results of Runs 1-9 are tabulated in Table I.

Table II shows the dihydroisophorone purity recovered from sample feeds of the reactor effluent to a distillation tower.

selectivity to dihydroisophorone with reduced hydrogen/isophorone molar ratios. Runs 5 and 6 indicate that good selectivities may be obtained at high hydrogen/isophorone ratios only if the reactant ratios are within their preferred limits. Runs 7-9 indicate increasing selectivity to dihydroisophorone at increasing temperatures.

TABLE II.—DISTILLATION OF REACTOR EFFLUENT

Conditions:
60 trays—Continuous distillation
20% overhead
30/1 reflux ratio
Atmospheric pressure distillation

| | Percent Composition | | | | | |
|---|---|---|---|---|---|---|
| | DIPH | β-IPH | t-ROH | C-ROH | α-IPH | Heavies |
| Feed A | 69.24 | 0.46 | 2.02 | 8.05 | 20.14 | 0.09 |
| Product A | 98.39 | 0.96 | 0.54 | 0.05 | | 0.05 |
| Feed B | 79.76 | 0.32 | 2.46 | 10.23 | 7.28 | 0.11 |
| Product B | 98.72 | 0.54 | 0.66 | 0.04 | 0.04 | |
| Feed C | 79.76 | 0.16 | 2.46 | 10.23 | 7.28 | 0.11 |
| Product C | 98.99 | 0.27 | 0.66 | 0.04 | 0.04 | |

Table II shows that a high purity product may be obtained by distilling the reactor effluent wherein the critical reaction conditions were maintained. A comparison of the β-isophorone content in Runs B and C reveals that a doubling of the β-isomer in the feed results in the doubling of the β-isomer in the product and, therefore, illustrates the difficulty of removing this isomer. Thus, one of the purposes of this invention is to maintain the β-isomer as

TABLE I

| Run | Feed Composition, Mole Percent | | | | Avg. Bed Temp., °C. | IPH Conv., Percent | Product Selectivity, Mole Percent | | | | |
|---|---|---|---|---|---|---|---|---|---|---|---|
| | DIPH | IPH | ROH | H₂/IPH | | | DIPH | ROH | Lights | Heavier | Other |
| 1 | 2.1 | 97.5 | 0.2 | 0.10 | 106 | 8.4 | 97.7 | 1.8 | | 0.4 | 0.1 |
| 2 | 82.8 | 11.5 | 5.5 | 0.88 | 102 | 25.5 | 57.6 | 38.6 | 3.0 | | 0.7 |
| 3 | 77.8 | 9.9 | 11.9 | 1.10 | 230 | 73.8 | 63.5 | 31.8 | 2.6 | 0.1 | 0.5 |
| 4 | 78.1 | 10.2 | 11.4 | 0.58 | 229 | 50.6 | 102.2 | −4.1 | 3.1 | 1.4 | −0.4 |
| 5 | 84.3 | 10.4 | 5.2 | 1.30 | 229 | 58.2 | 46.4 | 49.0 | 2.0 | 0.5 | |
| 6 | 78.8 | 9.8 | 11.1 | 1.32 | 230 | 65.9 | 90.4 | 7.5 | 2.6 | 0.5 | −0.2 |
| 7 | 77.8 | 10.3 | 11.7 | 0.83 | 210 | 57.1 | 76.6 | 22.9 | 1.0 | −0.9 | |
| 8 | 76.8 | 10.4 | 12.4 | 0.88 | 220 | 59.0 | 81.5 | 13.9 | 2.9 | 1.0 | 0.8 |
| 9 | 77.8 | 10.3 | 11.7 | 0.85 | 229 | 61.0 | 99.3 | −4.3 | 2.9 | −0.3 | 0.8 |

Run 1 illustrates the poor conversions obtained when only isophorone is hydrogenated. Such conditions result in the formation of large quantities of the β-isomer. Run 2 illustrates the poor selectivities obtained at low temperatures. Runs 3 and 4 show the remarkable increase in low as possible and this can be accomplished by carrying the isophorone conversion as far as possible without increasing the alcohol formation.

The following tables illustrate the effects of the varying critical conditions utilized in this invention.

TABLE III.—EFFECT ALCOHOL (ROH) CONCENTRATION

| Run Number | Feed Composition, Mole Percent | | | | | H₂/IPH, Molar Ratio | Avg. Bed Temp. (°C.) | Pressure (p.s.i.g.) | IPH Conv. (Percent) |
|---|---|---|---|---|---|---|---|---|---|
| | LTS | DIPH | IPH | ROH | Others | | | | |
| 10 | | 84.4 | 10.4 | 5.1 | 0.06 | 0.62 | 228 | 95 | 45.0 |
| 11 | 0.21 | 82.2 | 10.3 | 7.1 | 0.19 | 0.63 | 231 | 96 | 46.3 |
| 12 | 0.29 | 80.6 | 10.1 | 8.7 | 0.14 | 0.65 | 232 | 100 | 51.7 |
| 13 | 0.55 | 75.9 | 13.0 | 10.3 | 0.19 | 0.65 | 230 | 94 | 57.7 |
| 14 | 0.18 | 78.1 | 10.2 | 11.4 | 0.20 | 0.58 | 229 | 90 | 50.6 |

| Run Number | Product Composition, Mole Percent | | | | | Product Selectivity, Mole Percent | | | |
|---|---|---|---|---|---|---|---|---|---|
| | LTS | DIPH | IPH | ROH | Others | DIPH | ROH | LTS | Others |
| 10 | 0.15 | 87.6 | 5.7 | 6.4 | 0.15 | 67.7 | 27.3 | 3.1 | 1.9 |
| 11 | 0.34 | 85.6 | 5.5 | 8.4 | 0.18 | 69.6 | 27.0 | 2.7 | 0.6 |
| 12 | 0.44 | 84.7 | 4.9 | 9.9 | 0.18 | 77.5 | 18.9 | 2.9 | 0.8 |
| 13 | 0.84 | 82.4 | 5.5 | 11.2 | 0.25 | 86.9 | 11.9 | 3.9 | 0.8 |
| 14 | 0.34 | 83.3 | 5.0 | 11.2 | 0.25 | 95.8 | | 2.9 | 1.3 |

It is interesting to note the increase in DIPH selectivity from Run 10 to 12 to 14. Selectivity is increased by almost 30% while increasing the ROH concentration by only about 6%.

preferred levels. However, Runs 30 and 31 illustrate that when the temperature falls off the H₂/IHP ratio must be below 1.0/1.0 to obtain high selectivities. Runs 32–34 illustrate this effect for ROH concentration. Runs 35–37 illustrate that lowered H₂/IHP ratios serve to increase selectivity even when all other conditions are at their best levels.

TABLE IV.—EFFECT OF TEMPERATURE

| Run Number | Feed Composition, Mole Percent | | | | | $H_2/IPH$, Molar Ratio | Avg. Bed Temp. (°C.) | Pressure (p.s.i.g.) | IPH Conv. (Percent) |
|---|---|---|---|---|---|---|---|---|---|
| | LTS | DIPH | IPH | ROH | Others | | | | |
| 15 | 0.10 | 77.8 | 10.3 | 11.7 | 0.19 | 0.83 | 210 | 29 | 57.1 |
| 16 | 0.27 | 76.8 | 10.4 | 12.4 | 0.19 | 0.88 | 220 | 32 | 59.0 |
| 17 | 0.10 | 77.8 | 10.3 | 11.7 | 0.19 | 0.85 | 229 | 30 | 61.0 |
| 18 | | 84.4 | 10.4 | 5.1 | 0.06 | 0.65 | 212 | 102 | 43.5 |
| 19 | | 84.4 | 10.4 | 5.1 | 0.06 | 0.62 | 228 | 95 | 45.0 |
| 20 | 0.05 | 84.9 | 9.8 | 5.1 | 0.15 | 0.65 | 236 | 95 | 43.0 |
| 21 | 0.18 | 78.1 | 10.2 | 11.4 | 0.20 | 0.63 | 210 | 97 | 46.3 |
| 22 | 0.32 | 77.2 | 10.3 | 12.2 | 0.24 | 0.63 | 221 | 96 | 53.1 |
| 23 | 0.18 | 78.1 | 10.2 | 11.4 | 0.20 | 0.58 | 229 | 90 | 50.6 |
| 24 | 0.27 | 78.3 | 10.1 | 11.2 | 0.19 | 1.20 | 210 | 25 | 54.6 |
| 25 | 0.40 | 77.5 | 10.4 | 11.4 | 0.22 | 1.22 | 230 | 27 | 53.5 |
| 26 | 1.63 | 77.0 | 9.6 | 11.6 | 0.24 | 1.07 | 203 | 29 | 53.8 |

| Run Number | Product Composition, Mole Percent | | | | | Product Selectivity, Mole Percent | | | |
|---|---|---|---|---|---|---|---|---|---|
| | LTS | DIPH | IPH | ROH | Others | DIPH | ROH | LTS | Others |
| 15 | 0.16 | 82.2 | 4.4 | 13.1 | 0.14 | 76.2 | 22.8 | 1.0 | |
| 16 | 0.45 | 81.8 | 4.3 | 13.3 | 0.30 | 81.5 | 13.8 | 2.9 | 1.8 |
| 17 | 0.28 | 84.0 | 4.0 | 11.5 | 0.22 | 96.4 | | 2.8 | 0.8 |
| 18 | 0.04 | 86.8 | 5.9 | 7.2 | 0.17 | 51.0 | 45.7 | 0.9 | 2.4 |
| 19 | 0.15 | 87.6 | 5.7 | 6.4 | 0.15 | 67.7 | 27.3 | 3.1 | 1.9 |
| 20 | 0.23 | 88.0 | 5.6 | 6.2 | 0.18 | 73.3 | 21.8 | 4.3 | 0.7 |
| 21 | 0.28 | 81.4 | 5.5 | 12.8 | 0.21 | 69.4 | 28.4 | 2.1 | 0.4 |
| 22 | 0.49 | 81.8 | 4.7 | 12.9 | 0.19 | 84.4 | 12.0 | 3.1 | 0.5 |
| 23 | 0.34 | 83.3 | 5.0 | 11.2 | 0.25 | 95.8 | | 2.9 | 1.3 |
| 24 | 0.38 | 81.8 | 4.6 | 13.0 | 0.25 | 64.4 | 32.6 | 2.0 | 1.0 |
| 25 | 0.67 | 83.4 | 4.9 | 10.8 | 0.26 | 95.1 | | 4.4 | 0.6 |
| 26 | 1.60 | 80.2 | 4.4 | 13.6 | 0.25 | 61.2 | 38.4 | | 0.4 |

Run 26 illustrates the criticality of temperatures. All other relationships are at their preferred levels but a low temperature favors the formation of alcohol at the expense of DIPH.

TABLE V.—EFFECT OF HYDROGEN/ISOPHORONE RATIO

| Run Number | Feed Composition, Mole Percent | | | | | $H_2/IPH$, Molar Ratio | Avg. Bed Temp. (°C.) | Pressure (p.s.i.g.) | IPH Conv. (Percent) |
|---|---|---|---|---|---|---|---|---|---|
| | LTS | DIPH | IPH | ROH | Others | | | | |
| 27 | 0.10 | 77.8 | 10.3 | 11.7 | 0.19 | 0.85 | 229 | 30 | 61.0 |
| 28 | 0.12 | 78.8 | 9.8 | 11.1 | 0.19 | 1.32 | 230 | 29 | 65.9 |
| 29 | 0.23 | 78.8 | 9.7 | 11.1 | 0.16 | 1.42 | 230 | 33 | 66.9 |
| 30 | 0.18 | 78.1 | 10.2 | 11.4 | 0.20 | 0.63 | 210 | 97 | 46.3 |
| 31 | 0.23 | 77.8 | 9.9 | 11.9 | 0.16 | 1.15 | 211 | 104 | 65.5 |
| 32 | | 84.4 | 10.4 | 5.1 | 0.06 | 0.65 | 212 | 102 | 43.5 |
| 33 | 0.08 | 84.9 | 9.8 | 5.1 | 0.10 | 1.15 | 211 | 100 | 52.2 |
| 34 | 0.05 | 85.7 | 8.7 | 5.4 | 0.16 | 1.32 | 212 | 104 | 56.1 |
| 35 | 0.18 | 78.1 | 10.2 | 11.4 | 0.20 | 0.58 | 229 | 90 | 50.6 |
| 36 | 0.53 | 72.3 | 15.3 | 11.7 | 0.14 | 0.73 | 231 | 103 | 59.3 |
| 37 | 0.23 | 77.8 | 9.9 | 11.9 | 0.16 | 1.10 | 230 | 97 | 73.8 |

| Run Number | Product Composition, Mole Percent | | | | | Product Selectivity, Mole Percent | | | |
|---|---|---|---|---|---|---|---|---|---|
| | LTS | DIPH | IPH | ROH | Others | DIPH | ROH | LTS | Others |
| 27 | 0.28 | 84.0 | 4.0 | 11.5 | 0.22 | 96.4 | | 2.8 | 0.8 |
| 28 | 0.29 | 84.7 | 3.3 | 11.6 | 0.21 | 89.4 | 7.5 | 2.6 | 0.5 |
| 29 | 0.41 | 84.3 | 3.2 | 11.9 | 0.24 | 84.0 | 11.9 | 2.8 | 1.3 |
| 30 | 0.28 | 81.4 | 5.5 | 12.8 | 0.21 | 69.4 | 28.4 | 2.1 | 0.4 |
| 31 | 0.28 | 80.1 | 3.4 | 16.0 | 0.25 | 34.7 | 63.1 | 0.8 | 1.4 |
| 32 | 0.04 | 86.8 | 5.9 | 7.2 | 0.17 | 51.0 | 45.7 | 0.9 | 2.4 |
| 33 | 0.14 | 85.3 | 4.7 | 9.7 | 0.15 | 7.6 | 90.2 | 1.2 | 1.0 |
| 34 | 0.09 | 85.8 | 3.8 | 10.2 | 0.17 | 2.0 | 96.4 | 0.8 | |
| 35 | 0.34 | 83.3 | 5.0 | 11.2 | 0.25 | 95.8 | | 2.9 | 1.3 |
| 36 | 0.71 | 80.2 | 6.2 | 12.6 | 0.26 | 86.1 | 10.6 | 2.0 | 1.1 |
| 37 | 0.42 | 82.5 | 2.6 | 14.2 | 0.21 | 64.5 | 32.2 | 2.6 | 0.7 |

Runs 27–29 illustrate that the H₂/IHP ratio may be well above 1.0/1.0 when all other conditions are at their

TABLE VI.—EFFECT OF PRESSURE

| Run Number | Feed Composition, Mole Percent | | | | | $H_2/IPH$, Molar Ratio | Avg. Bed Temp. (°C.) | Pressure (p.s.i.g.) | IPH Conv. (Percent) |
|---|---|---|---|---|---|---|---|---|---|
| | LTS | DIPH | IPH | ROH | Others | | | | |
| 38 | 0.27 | 78.3 | 10.1 | 11.2 | 0.19 | 1.20 | 210 | 25 | 54.6 |
| 39 | 0.23 | 77.8 | 9.9 | 11.9 | 0.16 | 1.15 | 211 | 104 | 65.5 |
| 40 | | 85.4 | 9.8 | 4.8 | 0.08 | 0.93 | 210 | 30 | 54.1 |
| 41 | 0.17 | 82.3 | 12.6 | 4.9 | 0.20 | 0.88 | 211 | 99 | 50.2 |
| 42 | 0.10 | 77.8 | 10.3 | 11.7 | 0.19 | 0.83 | 210 | 29 | 57.1 |
| 43 | 0.55 | 75.9 | 13.0 | 10.3 | 0.19 | 0.72 | 211 | 93 | 49.6 |

| Run Number | Product Composition, Mole Percent | | | | | Product Selectivity, Mole Percent | | | |
|---|---|---|---|---|---|---|---|---|---|
| | LTS | DIPH | IPH | ROH | Others | DIPH | ROH | LTS | Others |
| 38 | 0.38 | 81.8 | 4.6 | 13.0 | 0.25 | 64.4 | 32.6 | 2.0 | 1.0 |
| 39 | 0.28 | 80.1 | 3.4 | 16.0 | 0.25 | 34.7 | 63.1 | 0.8 | 1.4 |
| 40 | 0.06 | 87.3 | 4.5 | 7.8 | 0.17 | 40.5 | 56.6 | 1.1 | 1.8 |
| 41 | 0.21 | 83.6 | 6.3 | 9.8 | 0.14 | 20.7 | 78.7 | 0.6 | |
| 42 | 0.16 | 82.2 | 4.4 | 13.1 | 0.14 | 76.2 | 22.8 | 1.0 | |
| 43 | 0.66 | 79.6 | 6.5 | 13.1 | 0.22 | 57.6 | 43.3 | 1.7 | 0.5 |

TABLE VII.—EFFECT OF PREFERRED CONDITIONS

| Run Number | Feed Composition, Mole Percent | | | | | $H_2$/IPH, Molar Ratio | Avg. Bed Temp. (°C.) | Pressure (p.s.i.g.) | IHP Conv. (Percent) |
|---|---|---|---|---|---|---|---|---|---|
| | LTS | DIPH | IPH | ROH | Others | | | | |
| 44 | 1.50 | 76.85 | 9.80 | 11.59 | 0.24 | 0.53 | 221 | 30 | 56.1 |
| 45 | 0.95 | 79.75 | 12.31 | 6.91 | 0.12 | 0.71 | 238 | 96 | 58.0 |
| 46 | 1.12 | 81.60 | 10.11 | 7.05 | 0.12 | 0.67 | 239 | 95 | 61.6 |
| 47 | 1.43 | 74.80 | 10.30 | 13.30 | 0.20 | 0.69 | 223 | 99 | 75.0 |
| 48 | 1.46 | 74.60 | 10.47 | 13.26 | 0.18 | 0.66 | 222 | 99 | 69.5 |
| 49 | 1.48 | 74.82 | 9.93 | 13.58 | 0.18 | 0.52 | 221 | 97 | 63.1 |
| 50 | 1.87 | 71.89 | 10.78 | 15.28 | 0.18 | 0.65 | 225 | 100 | 77.5 |
| 51 | 1.34 | 72.41 | 10.31 | 15.72 | 0.21 | 0.68 | 209 | 99 | 59.8 |
| 52 | 1.69 | 73.30 | 9.76 | 15.14 | 0.18 | 0.70 | 223 | 95 | 71.7 |
| 53 | 1.58 | 73.60 | 10.15 | 14.40 | 0.22 | 0.70 | 224 | 100 | 72.5 |
| 54 | 1.58 | 74.53 | 9.52 | 14.12 | 0.25 | 0.51 | 222 | 28 | 61.5 |
| 55 | 0.10 | 77.75 | 10.25 | 11.74 | 0.19 | 0.85 | 229 | 30 | 61.0 |
| 56 | 0.40 | 77.52 | 10.44 | 11.43 | 0.22 | 1.22 | 230 | 27 | 53.5 |
| 57 | 0.12 | 78.80 | 9.83 | 11.06 | 0.19 | 1.32 | 230 | 29 | 65.9 |
| 58 | 0.27 | 78.26 | 10.12 | 11.15 | 0.19 | 1.24 | 235 | 26 | 61.5 |
| 59 | 0.18 | 78.05 | 10.15 | 11.41 | 0.20 | 0.58 | 229 | 90 | 50.6 |
| 60 | 0.60 | 73.22 | 14.68 | 11.29 | 0.18 | 0.56 | 230 | 90 | 52.0 |
| 61 | 0.55 | 72.90 | 14.07 | 12.23 | 0.27 | 0.92 | 230 | 30 | 57.8 |

| Run Number | Product Composition, Mole Percent | | | | | Product Selectivity, Mole Percent | | | |
|---|---|---|---|---|---|---|---|---|---|
| | DIPH | ROH | IPH | Lights | Others | DIPH | ROH | Lights | Others |
| 44 | 82.60 | 11.39 | 4.25 | 1.52 | 0.23 | 99.3 | | 0.3 | 0.4 |
| 45 | 86.83 | 6.70 | 4.97 | 1.32 | 0.13 | 94.9 | | 5.0 | 0.1 |
| 46 | 87.70 | 6.92 | 3.88 | 1.40 | 0.11 | 95.6 | | 4.4 | |
| 47 | 83.20 | 12.60 | 2.56 | 1.50 | 0.18 | 99.2 | | 0.8 | |
| 48 | 81.88 | 12.93 | 3.37 | 1.56 | 0.27 | 97.6 | | 1.3 | |
| 49 | 83.00 | 11.53 | 3.67 | 1.65 | 0.17 | 98.0 | | 2.0 | |
| 50 | 81.10 | 14.74 | 2.43 | 1.58 | 0.17 | 100.0 | | | |
| 51 | 78.12 | 15.86 | 4.17 | 1.68 | 0.18 | 92.3 | 2.2 | 5.5 | |
| 52 | 80.60 | 14.62 | 2.76 | 1.79 | 0.23 | 98.0 | | 1.3 | 0.7 |
| 53 | 81.53 | 13.73 | 2.80 | 1.71 | 0.24 | 98.1 | | 1.6 | 0.3 |
| 54 | 82.61 | 11.78 | 3.67 | 1.73 | 0.25 | 98.2 | | 1.8 | |
| 55 | 84.00 | 11.47 | 4.00 | 0.28 | 0.22 | 96.4 | | 2.8 | 0.8 |
| 56 | 83.40 | 10.81 | 4.86 | 0.67 | 0.26 | 95.1 | | 4.4 | 0.6 |
| 57 | 84.70 | 11.55 | 3.30 | 0.29 | 0.21 | 89.4 | 7.5 | 2.6 | 0.5 |
| 58 | 85.32 | 9.96 | 3.89 | 0.58 | 0.25 | 95.1 | | 4.2 | 0.8 |
| 59 | 83.30 | 11.20 | 5.01 | 0.34 | 0.25 | 95.8 | | 2.9 | 1.3 |
| 60 | 80.52 | 11.42 | 7.05 | 0.88 | 0.22 | 94.3 | 1.7 | 3.6 | 0.5 |
| 61 | 81.35 | 11.58 | 5.95 | 0.82 | 0.32 | 96.3 | | 3.1 | 0.6 |

Table VII clearly illustrates the excellent product selectivity and therefore, product purity that can be obtained by the process of this invention. These runs further illustrate that at preferred operating conditions within the critical ranges, the selectivity to alcohol is reduced to zero. Further, Runs 56-58 illustrate the $H_2$/IPH ratios can range above 1.0/1.0 when the other operating conditions are at their preferred levels. However, as the data has shown, selectivity would be still further increased if the $H_2$/IPH ratio were reduced for these runs.

What is claimed is:

1. A process for preparing dihydroisophorone which comprises reacting hydrogen with a feed mixture comprising about 5-15 mole percent isophorone, about 5-15 mole percent 3,3,5-trimethylcyclo hexanol, and 70—90 mole percent dihydroisophorone, in the presence of a hydrogenation catalyst at temperatures above 210° C., and at a pressure ranging from 5-200 p.s.i.g.

2. The process of claim 1 wherein the hydrogen/isophorone molar ratio is below about 1.2/1.0.

3. The process of claim 1 wherein the temperature ranges from 210-250° C.

4. The process of claim 1 wherein the temperature ranges from 220-235° C.

5. The process of claim 1 wherein the isophorone is present in an amount ranging from about 10-15 mole percent.

6. The process of claim 1 wherein the 3,3,5-trimethylcyclohexanol is present in an amount ranging from about 10-12 mole percent.

7. A continuous process for preparing dihydroisophorine which comprises reacting hydrogen with a feed mixture comprising about 10-15 mole percent isophorone, about 10-12 mole percent 3,3,5-trimethylcyclohexanol and about 75-80 mole percent dihydroisophorone, in the presence of a hydrogenation catalyst, at temperatures ranging from about 210-250° C., pressures of about 5-200 p.s.i.g. a hydrogen/isophorone molar ratio of less than 1.2/1.0, recovering a reactor effluent, recycling from about 50-90 percent of the reactor effluent, and distilling the remainder of the reactor effluent to recover substantially pure dihydroisophorone.

8. The process of claim 7 wherein the hydrogen-isophorone molar ratio is less than 1.0/1.0.

9. The process of claim 7 wherein the pressure is about 20-100 p.s.i.g.

10. The process of claim 7 wherein the temperature is 225-230° C.

11. The process of claim 7 wherein the hydrogenation catalyst is nickel.

References Cited

UNITED STATES PATENTS 2,560,361 7/1951 Morrell _____ 260—586
2,081,322 5/1937 Carney _____ 260—660

BERNARD HELFIN, *Primary Examiner.*

MATTHEW W. JACOB, *Assistant Examiner.*

U.S. Cl. X.R.

260—631